(12) United States Patent
Welstand et al.

(10) Patent No.: US 10,816,832 B1
(45) Date of Patent: Oct. 27, 2020

(54) OPTICAL PHASE SHIFTER USING FINE LITHOGRAPHY DEFINED VOLUMETRIC JUNCTIONS

(71) Applicant: VEO, INC., San Diego, CA (US)

(72) Inventors: Robert B. Welstand, San Diego, CA (US); Chen-Kuo Sun, Escondido, CA (US); Rajat Sharma, San Diego, CA (US)

(73) Assignee: VEO, INC., San Diego, CA (US)

( * ) Notice: Subject to any disclaimer, the term of this patent is extended or adjusted under 35 U.S.C. 154(b) by 0 days.

(21) Appl. No.: 16/560,017

(22) Filed: Sep. 4, 2019

(51) Int. Cl.
*G02F 1/35* (2006.01)
*G02F 1/025* (2006.01)
*G02F 1/015* (2006.01)

(52) U.S. Cl.
CPC ...... *G02F 1/025* (2013.01); *G02F 2001/0152* (2013.01); *G02F 2203/50* (2013.01)

(58) Field of Classification Search
CPC ........ G02F 1/035; G02F 1/0356; G02F 1/025; G02F 2203/50; G02F 2001/0152
See application file for complete search history.

(56) References Cited

U.S. PATENT DOCUMENTS

| | | | |
|---|---|---|---|
| 4,008,947 A | 2/1977 | Baiies | |
| 4,127,320 A | 11/1978 | Li | |
| 4,240,693 A | 12/1980 | Johnson | |
| 4,728,167 A | 3/1988 | Soref | |
| 5,004,447 A | 4/1991 | Soref | |
| 5,159,699 A | 10/1992 | de Monts | |
| 5,937,115 A | 8/1999 | Domash | |
| 7,387,913 B2 | 6/2008 | Yoshimura | |
| 7,492,975 B2* | 2/2009 | Toyoda | G02B 6/12011 385/3 |
| 8,150,218 B2* | 4/2012 | Takahashi | G02F 1/011 385/1 |
| 8,355,605 B1* | 1/2013 | Wach | G02B 6/122 385/16 |
| 9,046,704 B2 | 6/2015 | Costache | |
| 9,500,929 B2 | 11/2016 | Sun | |
| 10,126,496 B1 | 11/2018 | Sun | |
| 2003/0219197 A1 | 11/2003 | Kawamoto | |
| 2003/0231394 A1 | 12/2003 | Kimura | |
| 2004/0240784 A1 | 12/2004 | Shih | |
| 2005/0254752 A1 | 11/2005 | Domash | |
| 2006/0261432 A1 | 11/2006 | Yoshimura | |
| 2007/0014519 A1 | 1/2007 | Aoki | |
| 2013/0034323 A1 | 2/2013 | Costache | |
| 2015/0093067 A1 | 4/2015 | Manouvrier | |
| 2017/0336658 A1 | 11/2017 | Chen | |

* cited by examiner

*Primary Examiner* — Jennifer Doan
(74) *Attorney, Agent, or Firm* — Nydegger & Associates

(57) ABSTRACT

In accordance with the present invention, an elongated phase shifting diode is provided for modulating an electrical signal onto an optical wave. Structurally, the phase shifting diode includes a p doped central stripe that extends through a phase shifting length L of a waveguide. $P^+$ doped finger stripes and $N^+$ doped finger stripes, which are laterally and axially offset from each other, extend into the waveguide for contact with the p doped central stripe along the length L. In combination, the plurality of $N^+$ doped finger stripes and the p doped central stripe create a plurality of PN junctions that are structurally aligned along the p doped central stripe to establish electrically parallel phase shifting functions for the elongated diode.

20 Claims, 4 Drawing Sheets

OPTICAL PHASE SHIFTER USING FINE LITHOGRAPHY DEFINED VOLUMETRIC JUNCTIONS

FIELD OF THE INVENTION

The present invention pertains generally to diodes that use their PN junctions for phase shifting optical waves. In particular, the present invention pertains to diode components that are axially aligned in an optical waveguide. The present invention is more particularly, but not exclusively, useful as an optical phase shifter wherein aligned PN junctions are established and positioned to provide electrically parallel functions for an elongated diode body.

BACKGROUND OF THE INVENTION

A PN junction is the interface between two regions in a semiconductor which have been treated (i.e. doped or implanted) with impurities so that one region is a P-type semiconductor and the other is an N-type semiconductor. From a technical perspective, the P-type region includes "acceptor impurities" which contribute free "holes" and the N-type region includes "donor impurities" which contribute free "electrons" to the semiconductor. A consequence of the intimate contact of the N-type and P-type semiconductors in thermal equilibrium is that a uni-directional potential barrier across the PN junction is created that blocks the flow of electrons and holes across the resulting space charge layer (McGraw-Hill Dictionary of Scientific and Technical Terms: Sixth Edition 2003). The space charge layer, also known as the depletion region, has a depletion width, $w_d$. This depletion region is the part of the diode that is devoid of free electrons and holes. Outside of the depletion region, the free electron density is determined by the concentration of "donor impurities" in the N-type region and the free hole density is determined by the concentration of "acceptor impurities" in the P-type region. The three regions together comprise the body of the diode. An external reverse bias will increase the depletion region width and displace additional free carriers from the body of the diode.

It is well known that semiconductor materials exhibit a phenomenon that is known as the plasma dispersion effect. Importantly, it is known according to the plasma dispersion effect that the index of refraction of a semiconductor material will change as its free carrier density is changed. It happens that these changes can be induced electronically by the application of an external voltage. Therefore, the refractive index, n, of the semiconductor PN diode will change as the depletion width $w_d$ is modulated.

Of particular interest for the present invention is how a plurality of PN junctions can be employed for high performance, in combination, to shift the phase of a light wave for the purpose of modulating an optical signal.

An accepted way by which the performance of a phase shifting waveguide may be determined is to consider several different operational factors. These factors include: efficiency $V_\pi * l_\pi$; optical loss $\alpha_{dB} * l_\pi / 2$; frequency response $1/(2*\pi*R_l C_l)$; and switching energy per bit to $l_\pi * C_l * V_\pi^2 / 4$; where l is a phase shifting unit length along an optical waveguide; $l_\pi$ is a length along an optical waveguide to accomplish a $\pi$ phase shift; $R_l$ is a resistance per unit length of the waveguide; $C_l$ is the capacitance per unit length of the waveguide; $V_\pi$ is a voltage required to induce a $\pi$ phase shift; and $\alpha_{dB}$ is an optical loss coefficient per unit length of the waveguide.

A total performance Figure of Merit (FOM) proposed by J Witzens (Proc. IEEE, Vol 106, No 12, Pp 2158-2182, December 2018), can be expressed as:

$$FOM = 1/(2*\pi*R_l C_l)/(\alpha_{dB} * l_\pi / 2)/(l_\pi * C_l * V_\pi^2 / 4)$$

In particular, the above expression for a total FOM signifies a tradeoff between the phase shifting diode's frequency bandwidth, its power requirements, efficiency and optical loss. Heretofore, the prior art has emphasized an increase in $C_l$ to achieve higher efficiency in a short length to reduce optical loss. The fact remains, however, that the modulation frequency bandwidth and power of a phase shifting waveguide can be further improved by reducing the capacitance density, and reconfiguring the interactive structure of doped regions in the phase shifting diode. Importantly, it is now possible, using fine lithography techniques, to create doped regions in a phase shifting diode that are spatially accurate to within a few tens of nanometers. Moreover, it is appreciated that by reconfiguring the N and P regions of a doped phase shifting diode, power and optical losses can be further minimized.

In consideration of the above, it is an object of the present invention to provide a highly efficient phase shifting capability for a phase shifting diode, while simultaneously reducing capacitance for low power and high frequency operation. Another object of the present invention is to provide a configuration for a phase shifting diode to affect depletion modulation without increasing the optical loss or modulating the electrical resistive loss. Still another object of the present invention is to provide full utilization of the interaction length and a high degree of overlap between the optical mode and phase shifting diodes for modulating an optical signal. Yet another object of the present invention is to provide a phase shifting waveguide that is immune to temperature and memory effect, that is simple to use, is relatively easy to manufacture, and is comparatively cost effective.

SUMMARY OF THE INVENTION

In accordance with the present invention, an optical phase shifter includes an optical waveguide which has a core that is surrounded by cladding. The waveguide has a phase shifting length L. It also has a top surface and a bottom surface with opposed first and second side surfaces therebetween that are at a distance R from each other.

A p doped central stripe is formed in the waveguide core between the top surface and the bottom surface, and it is centered between the first and second sides of the waveguide core. Dimensionally, the p doped central stripe has a width w1 that extends along the entire length L. Also, the width w1 of the p doped central stripe is less than R.

A plurality of P$^+$ doped finger stripes extends laterally into the waveguide in a first direction toward the p doped central stripe. Each P$^+$ doped finger stripe will contact the p doped central stripe. Also, a plurality of N$^+$ doped finger stripes extends laterally into the waveguide toward the p doped central stripe in a second direction. Like the P$^+$ doped finger stripes, each N$^+$ doped finger stripe also contacts the p doped central stripe. However, it is an important aspect of the present invention that contact between each N$^+$ doped finger stripe and the p doped central stripe will create a PN junction.

In the construction of the present invention, the first direction from which P$^+$ doped finger stripes contact the p doped central stripe, is opposite from the second direction of the N$^+$ doped finger stripes. Importantly, the N$^+$ doped finger stripes and PN junctions are laterally and axially offset from the $P^+$ doped finger stripes along the length L of the waveguide. This results in a three-dimensional diode body that comprises the p doped central stripe and lateral $P^+$ and $N^+$ doped finger stripes. At thermal equilibrium, a depletion region exists in a portion of the volume of the p doped central stripe.

For an electrical operation of the present invention, a first bus is connected to the plurality of $P^+$ doped finger stripes. Also, a second bus is connected to the plurality of $N^+$ doped finger stripes. In this combination the first bus and the second bus respectively act as electrodes. Thus, a reverse bias voltage, applied between the two electrodes, will modulate the depletion region by extending it further into the volume of the p doped central stripe and modifying the number of free-carriers in the diode body. It is this modulation that changes the optical phase of the optical wave as it passes through the waveguide.

Stripe widths and spacing establish the distance between adjacent PN junctions. It is envisioned for the present invention that several designs of doping concentrations, stripe dimensions, stripe spacings, and stripe positions are possible. Optimization of the doped regions is desired for simultaneously attaining high bandwidth, high efficiency, low switching energy, and low optical loss. In particular, the highly doped $N^+$ and $P^+$ finger stripes will contribute most to optical loss. Therefore, maintaining minimal interaction between the highly doped regions and the phase-shifting diode region of the p doped central stripe is most important for minimizing optical loss. On the other hand, the p doped central stripe width, spacing between P+ and $N^+$ doped finger stripes, and doping concentration of the p doped central stripe, together determine modulation efficiency.

For the present invention, each $P^+$ and $N^+$ doped finger stripe and the portion of the p doped central stripe between and immediately adjacent to the PN junction comprise a diode unit and all diode units comprise an elongated diode. With proper design, the depletion regions of adjacent diode units will merge within operational voltage limits to form a single elongated depletion region.

With the above in mind, a $P^+$ doped finger stripe will have a width w2, and an $N^+$ doped finger stripe will have a width w3. With a downstream direction determined by the propagation direction of the optical wave through the waveguide, the $P^+$ doped finger stripe is separated from the adjacent upstream $N^+$ doped finger stripe by an axial distance d32. It is also separated from the adjacent downstream $N^+$ doped finger stripe by an axial distance d23. Thus, the axial distance between adjacent PN junctions is equal to d32+w2+d23.

For one embodiment of the optical phase shifter of the present invention, each $P^+$ doped finger stripe will have a width w2 and each $N^+$ doped finger stripe will have a width w3, and the distances d32 and d23 between $P^+$ and $N^+$ doped finger stripes are common for the plurality of $N^+$ and $P^+$ doped finger stripes. In this embodiment, a uniform pitch w3+d32+w2+d23 between PN junctions is periodically repeated for all diode units along the length L of the waveguide. On the other hand, when at least one of the dimensions, w2, w3, d32 or d23 is varied among diode units, an irregular pitch may be established between PN junctions along the length L of the waveguide.

Another variation for the implanted (doped) regions of a diode unit involves modification of the $P^+$ and $N^+$ doped finger stripe placement relative to the p doped central stripe. For example, the $P^+$ doped finger stripe line-end can extend into the p doped central stripe by an extension distance x2. Likewise, the $N^+$ doped finger stripe line-end can extend into the p doped central stripe by an extension distance x3. It is also possible that the line-ends exactly abut or stop short of the p doped central stripe. In cases where a line-end extends past the p doped central stripe edge, the extension distance is positive. In cases where a line-end exactly abuts the p doped central stripe edge, the extension distance is zero. In cases where a line-end stops short of contacting the p doped central stripe edge, the extension distance is negative.

For a preferred embodiment of the present invention, both P+ and N+ line-ends exactly abut the p doped central stripe having line-end extension distances x2=0 and x3=0. To ensure connection to both P+ and N+ doped finger stripes, the p doped central stripe will attach to p doped lateral protrusions that extend from the p doped central stripe and overlap the P+ and N+ doped finger stripes on respective sides. In an alternate embodiment with x2<0, each $P^+$ doped finger stripe can then contact a p doped lateral protrusion extending from the p doped central stripe, rather than contacting the p doped central stripe directly. Likewise, for x3<0, each N+ doped finger stripe can contact a p doped lateral protrusion extending from the p doped central stripe. In this case, it will also be appreciated that contact between an $N^+$ doped finger stripe and a p doped lateral protrusion will counter-dope the p doped lateral protrusion to create a PN junction in a volume that is external to the p doped central stripe. Additional variations are possible, such as when each $N^+$ doped finger stripe overlaps the p doped central stripe (x3>0) to create a counter-doped N region within the p doped central stripe, or extends beyond the p doped central stripe (x3>w1) to create opposed PN junctions within the p doped central stripe. In any event, the result is that aligned PN junctions are established and positioned to provide electrically parallel functions for an elongated diode body.

A method for manufacturing an optical phase shifter in accordance with the present invention involves employing commercially available techniques of fine lithography to create an elongated diode body. To begin, it is necessary to obtain a standard workpiece having an upper layer of semiconductor material (e.g. silicon) positioned over a lower layer of an insulating dielectric (e.g. buried oxide). In this combination the upper layer of semiconductor material has an exposed upper surface and it has a lower surface which is adjacent to the dielectric layer. Structurally, the exposed upper surface of the workpiece will include fiducials to which the fine lithography masks can align and therewith define a longitudinal axis and an origin.

The method of manufacturing proceeds with lithography and implantation into the upper layer semiconductor using a first implant mask for p doping a central stripe into the workpiece. A plurality of lateral protrusions that extend from the p doped central stripe toward a first-side for connecting to P+ doped finger stripes and toward a second-side for connecting to N+ doped finger stripes are also included in this first implant mask. In detail, the method for manufacturing generally includes several steps for each doping mask operation. A first step includes the deposition of sacrificial masking materials for each construction step, wherein at least one sacrificial masking material is patternable using a lithography method. A second step includes transfer of the construction mask pattern to the workpiece using fiducials visible from prior process steps for alignment. A third step includes selective removal of the sacrificial masking materials and hardening of the remaining masking materials. An additional step may include further patterning of sacrificial layers by etching. A fourth step includes introduction of impurities (dopants) into selective areas of the workpiece through openings in the sacrificial masking materials. A fifth step includes the removal of residual sacrificial masking layers. A sixth step includes thermal annealing of the workpiece to activate dopants.

The method of manufacturing continues with lithography and implantation using a second implant mask for doping the plurality of P+ doped finger stripes into the workpiece to establish a plurality of diode unit first connections via respective p doped first-side lateral protrusions.

The method of manufacturing continues with lithography and implantation using a third mask which is used for N+ doping a plurality of lateral finger stripes into the workpiece. In detail, each N+ doped finger stripe overlaps and counter-dopes a respective p doped second-side lateral protrusion, to thereby collectively create PN junctions. Additionally, the N+ doped finger stripes establish a plurality of diode unit second connections.

Once the doping steps are completed, an etch mask is used to etch a waveguide into the upper layer of semiconductor material. Specifically, the waveguide core is centered on the p doped central stripe, and it has a width R and a height h and extends beyond the length L of the implanted semiconductor material. This etching removes semiconductor material from the workpiece outside of the waveguide core. In one embodiment, less than the full depth of the upper layer semiconductor is removed during this etch process in order to form a slab portion of semiconductor material. This leaves portions of the upper layer semiconductor outside the waveguide core for making subsequent electrical contact from the P+ and N+ doped finger stripes to the first bus and second bus.

In detail, the method for manufacturing generally includes several steps for an etch mask operation. A first step includes the deposition of sacrificial masking materials for each construction step, wherein at least one sacrificial masking material is patternable using a lithography method. A second step includes transfer of the construction mask pattern to the workpiece using fiducials visible from prior process steps for alignment of the mask with the workpiece. A third step includes selective removal of the sacrificial masking materials and hardening of the remaining masking materials. A fourth step includes etching into selective areas of the workpiece, specifically the upper semiconductor layer external to the sidewalls of the waveguide core, through openings in the sacrificial masking materials. A fifth step includes removal of residual sacrificial masking layers.

Following a waveguide etch, a next step typically includes deposition of at least one dielectric material over the workpiece to planarize topography and form waveguide top cladding and to passivate the semiconductor.

It is to be appreciated that the various implantation and etching steps disclosed above can be customized to create, within limits, a particularly desired structural configuration for an elongated phase shifting diode. For instance, the P+ doped finger stripes and the N+ doped finger stripes can be modified in shape or in length. For example, by using appropriate additional masks the line-ends can be self-aligned to the p doped central stripe edge, or have the particular lateral P+ and N+ doped finger stripes remain short of the p doped central stripe, rather than extend into the p doped central stripe, or cross over the p doped central stripe. Further, by applying mask bias or optical proximity correction to the mask shapes, the various stripe widths and shapes can be varied to counteract diffraction-limited shape distortions, particularly at line-ends, corners, and at perpendicular intersections. One example of mask bias is the addition or subtraction of serifs at corners and edges. Moreover, implant profiles can be tailored to be uniform, non-uniform, or offset from one another through the depth of the semiconductor h.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
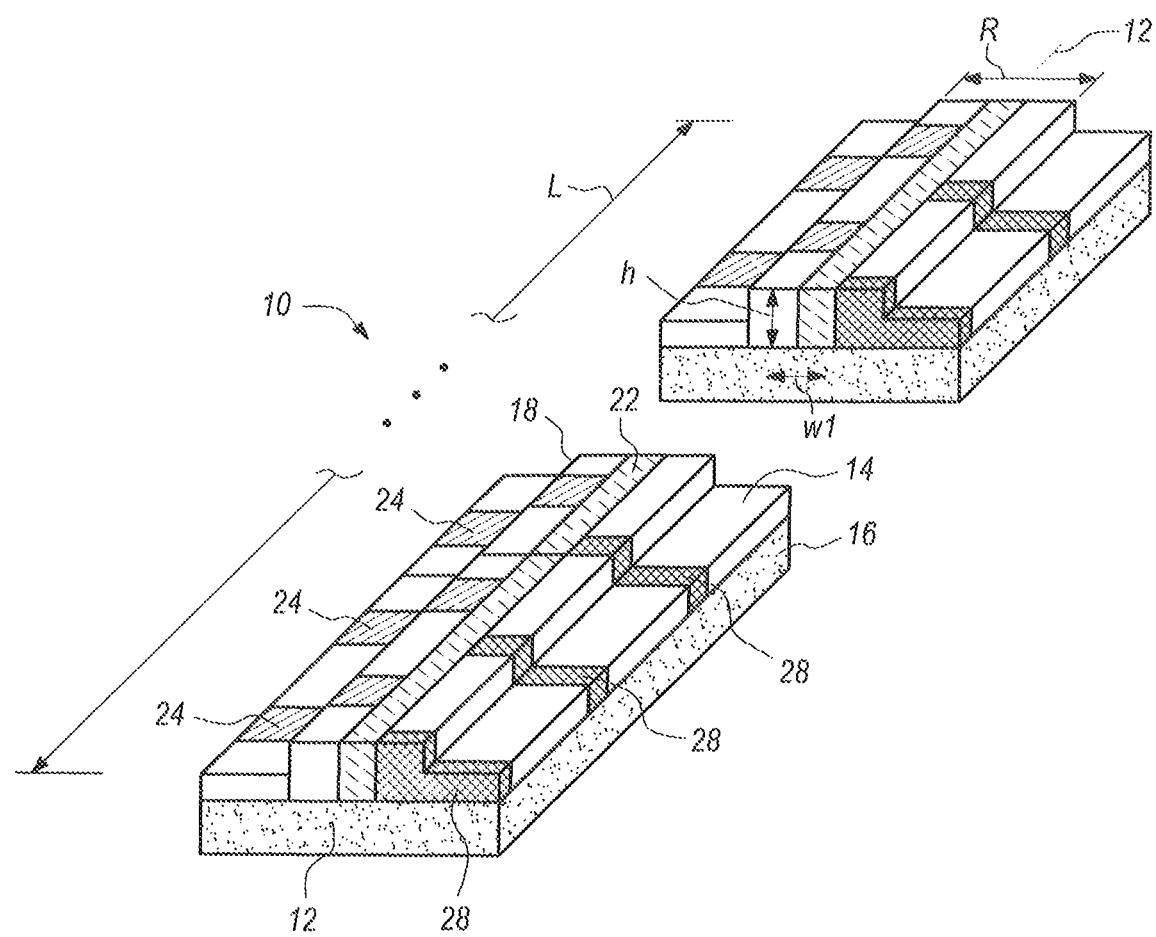
FIG. 1 is a perspective view of a plurality of phase shifting diode units axially aligned for collective use as an elongated diode, to shift the phase of an optical signal.

An optical phase shifter in accordance with the present invention is shown in FIG. 1 and is generally designated 10. As shown, the phase shifter 10 is elongated and it has a longitudinal axis 12. The phase shifter 10 includes an upper layer 14 that is made of a semiconductor material, such as silicon, and it includes a lower layer 16 that is made of a dielectric, such as buried oxide. FIG. 1 also shows that the upper layer 14 is etched to form a waveguide core 18 having a width R. FIG. 1 also shows that the phase shifter 10 will extend along the axis 12 through a phase shifting length L. Functionally, the waveguide core 18 establishes an optical waveguide that extends along the length L. As will be appreciated by further disclosure below, the exact shape of the waveguide core 18 may be varied. The rectangular presentation shown in FIG. 1 is only exemplary.

Figure 2:
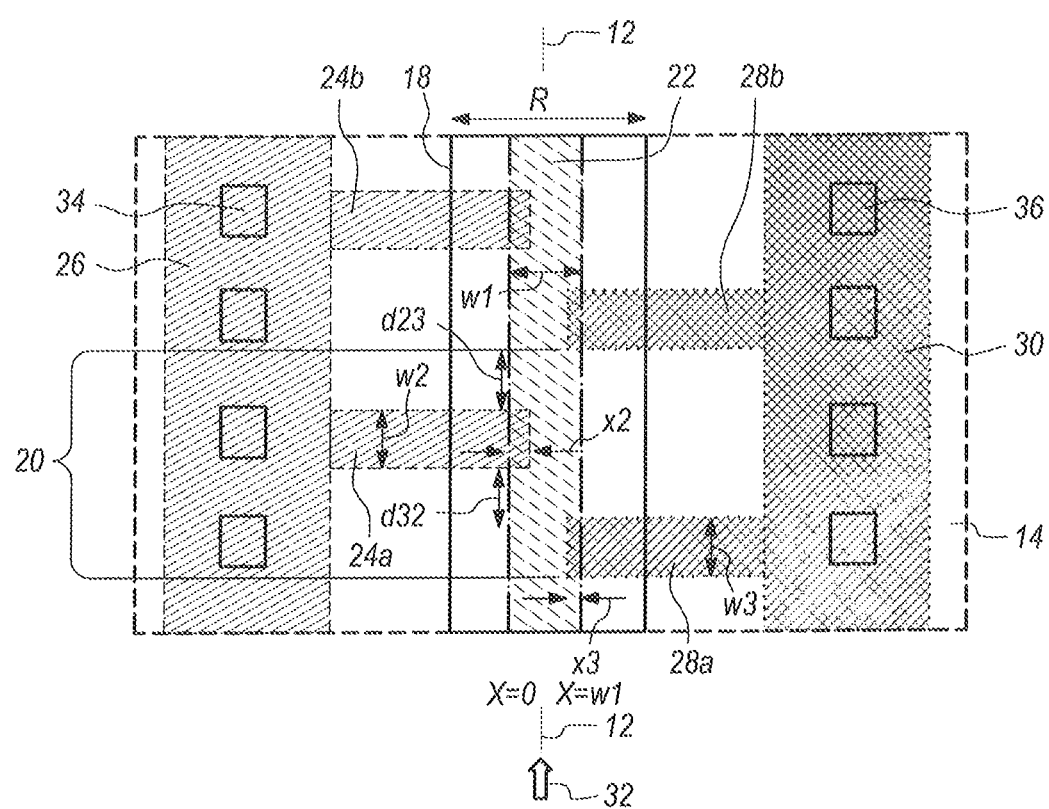
FIG. 2 is a top view of an implantation scheme for the present invention, showing doped regions for a phase shifting diode, and exemplary dimensions for the doped regions, in accordance with the present invention.

With reference to FIG. 2, it is to be appreciated that this figure is primarily intended to identify dimensions for specific components of the present invention. Specifically, this is done to generally show their positional and structural relationship with other components. Further, it is to be appreciated that the various dimensions shown in FIG. 2, and the respective configurations for different components, can be varied somewhat, as desired. Their functionality, however, will remain the same.

In FIG. 2 it will be seen that a diode unit 20 is identified. In accordance with further disclosure provided below, the diode unit 20 serves as a basic building block for the optical phase shifter 10. Thus, it will be appreciated that a plurality of contiguous diode units 20 can be aligned along the length L. Preferably, the diode units 20 will all define a same pitch for the optical phase shifter 10.

Identifiable components for the optical phase shifter 10 include a p doped central stripe 22 that extends along the entire length L of the optical phase shifter 10. Also, a plurality of P+ doped finger stripes 24, of which the P+ doped finger stripes 24a and 24b are exemplary, extend between a first bus 26 and the p doped central stripe 22. Similarly, a plurality of N+ doped finger stripes 28, of which the N+ doped finger stripes 28a and 28b are exemplary, extend between a second bus 30 and the p doped central stripe 22.

For the arrangement of stripes 22, 24 and 28 shown in FIG. 2, the p doped central stripe 22 will have a width w1, the P+ doped finger stripes 24 will have a width w2, and the N+ doped finger stripes 28 will have a width w3. Further, using the arrow 32 to indicate the direction of propagation for an optical signal passing through the optical phase shifter 10, FIG. 2 also shows that an upstream N+ doped finger stripe 28a will be separated from its adjacent downstream P+ doped finger stripe 24a by a distance d32. Similarly, the P+ doped finger stripe 24a will be separated from its next adjacent downstream N+ doped finger stripe 28b by a distance d23. In this arrangement, w3 may or may not equal w2, and the distance d32 may or may not equal the distance d23. In any event, a pitch within each diode unit 20 will be equal to w3+d32+w2+d23. By varying the value of at least one variable from one diode unit 20 to another value in an adjacent diode unit 20, it can also be appreciated that the pitch can be randomized.

Figure 3:
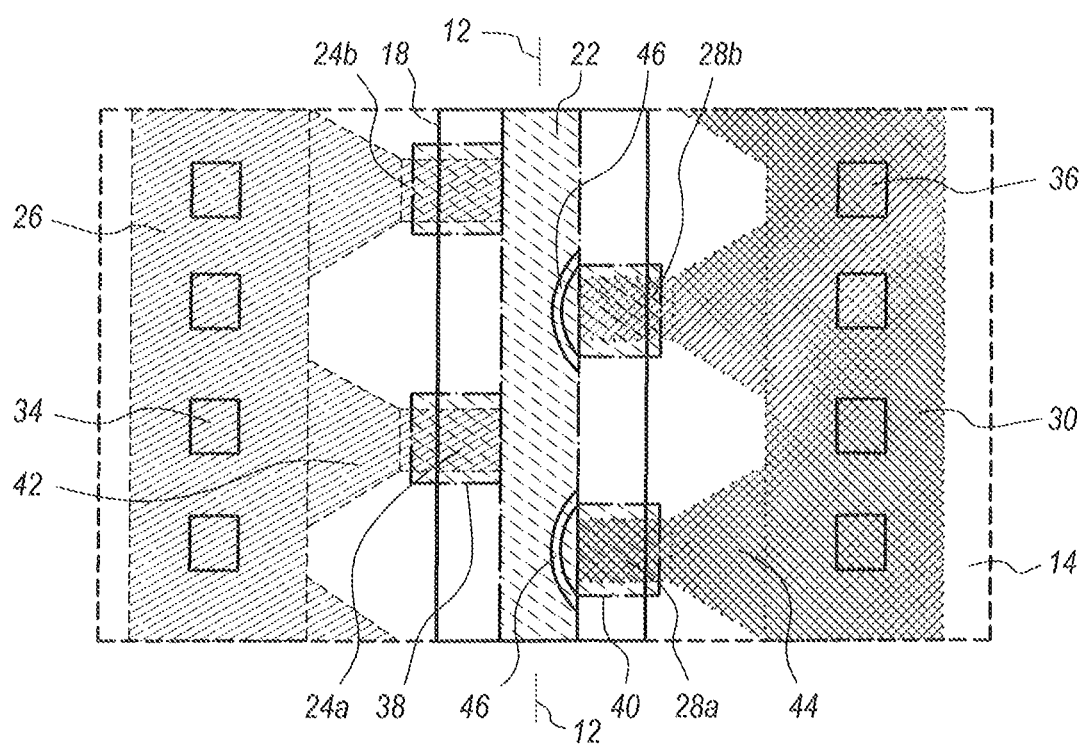
FIG. 3 is a preferred embodiment for the implantation scheme shown in FIG. 2.

For a preferred embodiment of the optical phase shifter 10, cross reference FIG. 2 and FIG. 3. There it will be seen that the first bus 26 includes a plurality of electrical anode contacts 34. Similarly, the second bus 30 includes a plurality of electrical cathode contacts 36. Also shown in FIG. 3 are a series of first-side lateral protrusions 38, which are attached to the p doped central stripe 22. As shown, the first-side lateral protrusions 38 extend laterally from the p doped central stripe 22 toward the first bus 26. Likewise, a series of second-side lateral protrusions 40, which are also attached to the p doped central stripe 22, extend laterally from the p doped central stripe 22 toward the second bus 30. FIG. 3 also shows that the P+ doped finger stripes 24 include a first-side fan-out connection 42 that individually interconnects each P+ doped finger stripe 24 with the first bus 26, and that the N+ doped finger stripes 28 include a second-side fan-out connection 44 that individually interconnects each N+ doped finger stripe 28 with the second bus 30.

The doping scheme for the present invention is best appreciated with reference to FIG. 3. There, it is to be appreciated that the central stripe 22 is p doped, as well as both lateral protrusions 38 and 40. It is also to be appreciated that the P+ finger stripes 24, the first bus 26 and the first-side fan-out connections 42 are all P+ doped. Additionally, the N+ finger stripes 28, the second bus 30 and the second-side fan-out connections 44 are all N+ doped. An important consequence here is that the N+ doped finger stripes 28 collectively establish a plurality of PN junctions axially aligned along the p doped central stripe 22.

Within the doping scheme disclosed above, the first bus 26 establishes an anode for the optical phase shifter 10 and the second bus 30 establishes a cathode for the optical phase shifter 10. Thus, a voltage source (not shown) can be electrically connected via anode contacts 34, cathode contacts 36, and buses 26 and 30 with the optical phase shifter 10 to provide an electrical signal that will modulate the number of free carriers in the volume of the p doped central stripe 22 between the P+ doped finger stripes 24 and the N+ doped finger stripes 28. In accordance with the present invention, this modulation is coordinated through the entire elongated diode body due to the electrically parallel functions of all diode units. In one electrical signal state, the depletion region 46 minimally impinges into the p doped central stripe in the vicinity of the plurality of PN junctions.

In a second electrical signal state, the depletion region 46 grows to almost completely occupy the volume of the p doped central stripe 22.

As envisioned for the present invention, an optical phase shifter 10 in accordance with the present invention can be manufactured using well known fine lithography techniques. Accordingly, the present invention envisions that dimensions of components used for the present invention can be accurate within the range of a few to tens of nanometers. Moreover, the present invention envisions that with this accuracy, various configurations can be incorporated into the present invention to augment its electro-optical advantages. By way of example, the p doped central stripe 22 may be created with simple Gaussian or Pearson doping profiles or complex combinations of doping profiles that can approximate a cross section shape, perpendicular to the length L of the waveguide core, that may be either a circle, semi-circle, ellipse, truncated ellipse, rectangle, top-hat, octagon, trapezoid, hexagon, triangle, or inverted-triangle. Also, the p doped central stripe 22 and P+ doped finger stripes 24 and N+ doped finger stripes 28 can be formed with a top view having the shape of a broad line, rectangle, trapezoid, zig-zag, circle, circular section, ellipse, elliptical section, ring, annulus, racetrack, oval curved line, or curved approximation of any polygon.

A method for manufacturing an optical phase shifter 10 in accordance with the present invention requires providing a standard workpiece 48. The workpiece 48 will include an upper layer of semiconductor material 14 that is positioned over a lower layer of a dielectric 16. The upper layer of semiconductor material 14 will have an exposed upper surface and its lower surface will be integrated with the lower layer dielectric 16. The workpiece 48 will have an origin and printed fiducials on the exposed upper surface that define a longitudinal axis 12.

Figure 4:
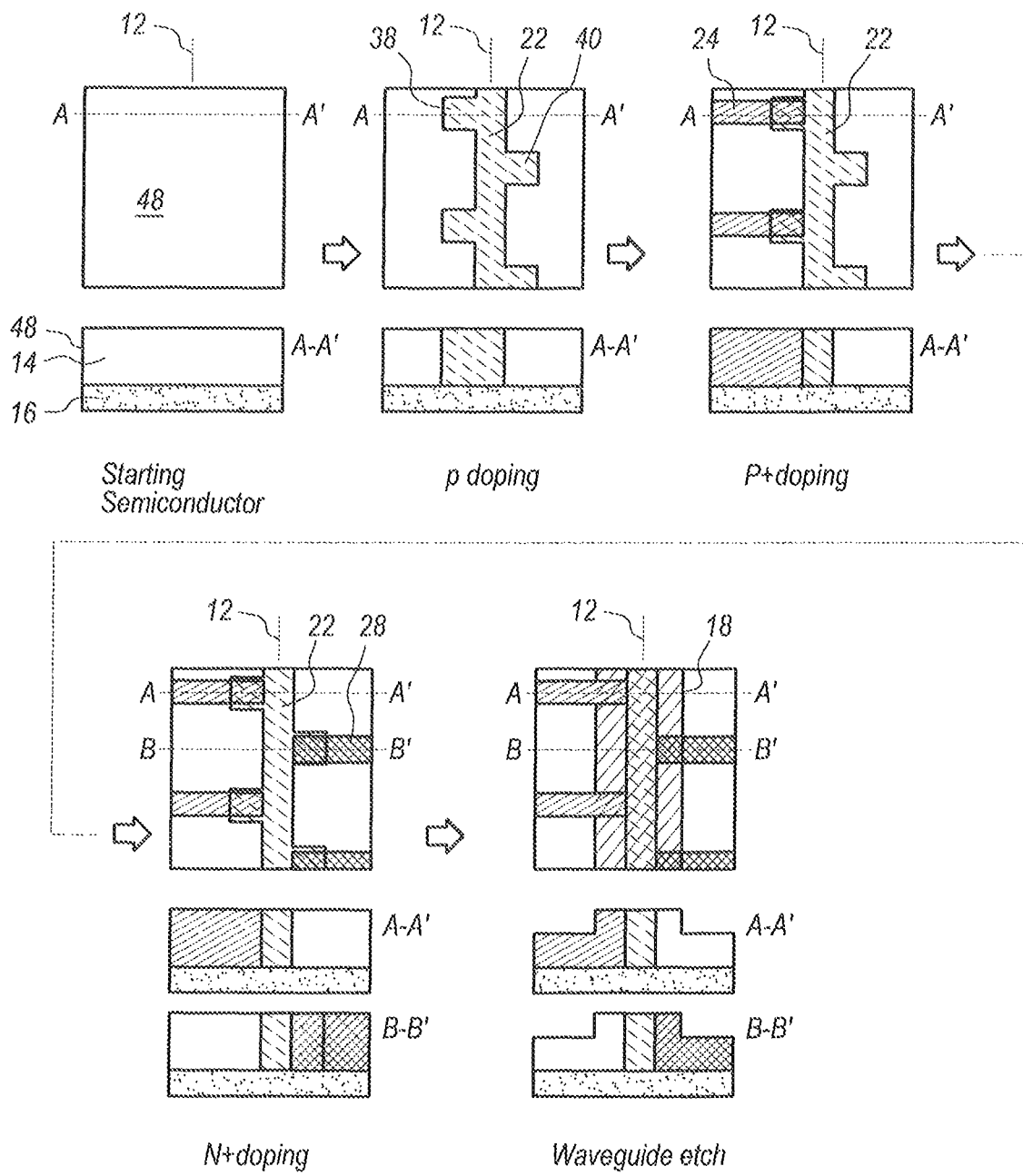
FIG. 4 shows sequential top views of implantation steps, with corresponding cross-sectional views (A-A', B-B'), needed to create doped regions for phase shifting diode units used by the present invention (note: implantation steps are not necessarily presented in a required order).

The doping scheme mentioned above for the optical phase shifter 10 will be best appreciated with reference to FIG. 4, and with cross reference to FIG. 2 and FIG. 3. Using a first implant mask (not shown), fine lithography can be employed on the workpiece 48 to create the p doped central stripe 22 having a length L and width w1. Also created with the first implant mask will be the plurality of p doped first-side lateral protrusions 38. Additionally, a plurality of p doped second-side lateral protrusions 40 are created into the workpiece 48 on the side of the p doped central stripe 22 that is opposite the first-side lateral protrusions 38. Importantly, the p doped central stripe 22 is aligned and extends axially along the longitudinal axis 12. The p doped first-side lateral protrusions 38 are separated from each other by the diode unit pitch w3+d32+w2+d23, and the second-side lateral protrusions 40 on the opposite side of the p doped central stripe 22 are axially offset from the p doped first-side lateral protrusions 38 by a distance w2+d23.

A second implant mask (not shown) is used for P+ doping a plurality of lateral P+ doped finger stripes 24 into the workpiece 48 and to overlay the p doped first-side lateral protrusions 38. The second implant mask is aligned to the longitudinal axis 12 and workpiece origin so that the line-ends of the P+ doped finger stripes 24 are positional with the desired extension distance x2 relative to the p doped central stripe 22. Also, the first-side fan-out connections 42, along with the first bus 26 are P+ doped in this step.

N+ doping a plurality of lateral N+ doped finger stripes 28 into the workpiece 48 is accomplished using a third mask (not shown). The third implant mask is aligned to the longitudinal axis and workpiece origin so that the N+ doped finger stripes 28 are positioned with the desired extension distance x3 relative to the p doped central stripe 22 and overlay the p doped second-side lateral protrusions 40. Also, the second-side fan-out connections 44 and second bus 30 are N+ doped in this step.

As a final step, an etching mask (not shown) is used to etch into the upper layer of semiconductor material 14 in the workpiece 48 to create the waveguide core 18. The etching mask is aligned to the longitudinal axis 12 and workpiece origin. In detail, the etched waveguide core 18 will be centered on the p doped central stripe 22, it will have a width R that is greater than w1, and the after-etch height of the upper layer semiconductor outside the waveguide core 18 will be less than a full depth h of the upper layer of semiconductor material inside the waveguide core 18. This etching will extend beyond the length L.

While the particular Optical Phase Shifter Using Fine Lithography Defined Volumetric Junctions as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An optical phase shifter which comprises:
    an optical waveguide having a core surrounded by cladding and a length L, wherein the core has a top surface and a bottom surface with opposed first and second side surfaces therebetween, wherein the side surfaces of the core are at a distance R from each other;
    a p doped central stripe formed in the waveguide core between the top surface and the bottom surface and centered between the first and second sides of the waveguide core, wherein the p doped central stripe has a width w1 perpendicular to the length L, and wherein w1 is less than R;
    a plurality of $P^+$ doped finger stripes, wherein each $P^+$ doped finger stripe extends laterally into the waveguide in a first direction toward the p doped central stripe to contact the p doped central stripe;
    a plurality of $N^+$ doped finger stripes, wherein each $N^+$ doped finger stripe extends laterally into the waveguide in a second direction toward the p doped central stripe, to contact the p doped central stripe and create a PN junction therewith, wherein the first direction is opposite the second direction, and wherein the $N^+$ doped finger stripes are laterally and axially offset from the $P^+$ doped finger stripes for their respective contact with the p doped central stripe;
    a first bus connected to the plurality of $P^+$ doped finger stripes; and
    a second bus connected to the plurality of $N^+$ doped finger stripes wherein the first bus and the second bus electrically combine the PN junctions, in structural alignment with each other along the length L, to establish an elongated diode body with electrically parallel functions, wherein the elongated diode body includes the entire volume of the p doped central stripe for phase shifting an optical wave as the optical wave passes through the waveguide.

2. The optical phase shifter of claim 1 wherein the first bus and the second bus respectively act as first and second electrodes for the diode, and wherein a depletion region in the volume of the p doped central stripe is modulated by a reverse bias voltage applied between the first and second electrodes to modulate the number of free-carriers therebetween for changing the optical phase of the optical wave.

3. The optical phase shifter of claim 1 wherein the p doped central stripe has a cross section perpendicular to the length L of the waveguide core, and the cross section has a shape selected from the group consisting of a circle, semi-circle, ellipse, truncated ellipse, rectangle, top-hat, octagon, trapezoid, hexagon, triangle, and inverted-triangle.

4. The optical phase shifter of claim 1 wherein the p doped central stripe and the N+ and P+ doped finger stripes have a top view with a shape selected from the group consisting of a broad line, rectangle, trapezoid, zig-zag, circle, circular section, ellipse, elliptical section, ring, annulus, racetrack, oval, curved line, and curved approximation of any polygon.

5. The optical phase shifter of claim 1 wherein a $P^+$ doped finger stripe has a width w2 and an $N^+$ doped finger stripe has a width w3, and wherein, with a downstream direction determined by the propagation direction of the optical wave, the $P^+$ doped finger stripe is separated from an adjacent upstream $N^+$ doped finger stripe by a distance d32 and is separated from an adjacent downstream $N^+$ doped finger stripe by a distance d23, to establish a distance equal to d32+w2+d23 between adjacent PN junctions.

6. The optical phase shifter of claim 5 wherein w2 is common for each $P^+$ doped finger stripe, w3 is common for each $N^+$ doped finger stripe, the separation distances d32 are common and the separation distances d23 are common along the length L to periodically repeat a pitch equal to w3+d32+w2+d23 between PN junctions along the length L of the waveguide.

7. The optical phase shifter of claim 5 wherein at least one dimension selected from the group consisting of w2, w3, d32 and d23 is variable to irregularly repeat the pitch between PN junctions along the length L of the waveguide.

8. The phase shifter of claim 1 wherein each $P^+$ doped finger stripe extends inwardly toward the p doped central stripe to a respective location short of the p doped central stripe for overlap and contact with a p doped lateral protrusion extending from the p doped central stripe toward the first side of the waveguide core.

9. The phase shifter of claim 1 wherein each $N^+$ doped finger stripe extends inwardly toward the p doped central stripe to a respective location short of the p doped central stripe for overlap with a p doped lateral protrusion extending from the p doped central stripe toward the second side of the waveguide core, and wherein the overlap between the $N^+$ doped finger stripe and a respective p doped lateral protrusion counter-dopes the p doped lateral protrusion and creates a PN junction in a volume external to the p doped central stripe.

10. The optical phase shifter of claim 1 wherein each $N^+$ doped finger stripe overlaps the p doped central stripe to create a counter-doped N region within the p doped central stripe.

11. The optical phase shifter of claim 1 wherein each $N^+$ doped finger stripe extends beyond the p doped central stripe to create a counter-doped N region having opposed PN junctions within the p doped central stripe.

12. An elongated diode for shifting the phase of an optical signal, wherein the elongated diode includes a plurality of diode units and each diode unit comprises:
    a portion of an optical waveguide, wherein the waveguide has an axis, has a phase shifting length L, and includes a p doped central stripe extending along the length L of the waveguide;

a PN junction, wherein the PN junction is created by contacting the p doped central stripe of the diode unit with an $N^+$ doped finger stripe;

a $P^+$ doped finger stripe contacting the p doped central stripe at a contact point, wherein the diode units are consecutively aligned together with the PN junction of each $N^+$ doped finger stripe being straddled between adjacent $P^+$ doped finger stripes and their respective contact points with the p doped central stripe along the length L, and wherein the contact point for each $P^+$ doped finger stripe is at a respective distance from each adjacent PN junction with a portion of the p doped central stripe positioned between each contact point and the PN junction;

a first bus connected to the plurality of $P^+$ doped finger stripes; and a second bus connected to the plurality of $N^+$ doped finger stripes wherein the first bus and the second bus electrically combine the PN junctions, in structural alignment with each other along the length L, to establish an elongated diode body with electrically parallel functions, wherein the elongated diode body includes the entire volume of the p doped central stripe for phase shifting an optical wave as the optical wave passes through the waveguide.

13. The elongated diode of claim 12 wherein the p doped central stripe has a width w1 along the length L, wherein the $P^+$ doped finger stripes and the $N^+$ doped finger stripes are uniform in doping profile through the depth h of the upper layer of semiconductor and respectively extend laterally into the waveguide toward the p doped central stripe from opposite directions to contact the p doped central stripe, and wherein each $P^+$ doped finger stripe has a width w2 and each $N^+$ doped finger stripe has a width w3, and wherein, with a downstream direction determined by the propagation direction of the optical wave, the $P^+$ doped finger stripe is separated from an adjacent upstream $N^+$ doped finger stripe by a distance d32 and is separated from an adjacent downstream $N^+$ doped finger stripe by a distance d23, to establish a distance equal to d32+w2+d23 between adjacent PN junctions.

14. The elongated diode of claim 13 wherein w2 is common for each $P^+$ doped finger stripe, w3 is common for each $N^+$ doped finger stripe, the separation distances d32 are common and the separation distances d23 are common to periodically repeat a pitch equal to w3+d32+w2+d23 between PN junctions along the length L of the waveguide.

15. The elongated diode of claim 13 wherein at least one dimension selected from the group consisting of w2, w3, d32 and d23 is variable to irregularly repeat the pitch between PN junctions along the length L of the waveguide.

16. The elongated diode of claim 13 wherein each $P^+$ doped finger stripe extends inwardly toward the p doped central stripe to a respective location short of the p doped central stripe for overlap and contact with a p doped lateral protrusion extending from the p doped central stripe toward the first side of the waveguide core.

17. The elongated diode of claim 13 wherein each $N^+$ doped finger stripe overlaps the p doped central stripe to create a counter-doped N region within the p doped central stripe.

18. The elongated diode of claim 13 wherein each $N^+$ doped finger stripe extends inwardly toward the p doped central stripe to a respective location short of the p doped central stripe for overlap with a p doped lateral protrusion extending from the p doped central stripe toward the second side of the waveguide core, and wherein the overlap between the $N^+$ doped finger stripe and a respective p doped lateral protrusion counter-dopes the p doped lateral protrusion and creates a PN junction in a volume external to the p doped central stripe.

19. A method for manufacturing an optical phase shifter having a plurality of structurally aligned contiguous diodes with electrically parallel functions, wherein the method comprises the steps of:

providing a workpiece, wherein the workpiece includes an upper layer of semiconductor material positioned over a lower layer of a buried oxide, wherein the upper layer of semiconductor material has an exposed upper surface and a lower surface adjacent the layer of buried oxide with opposed first and second sides extending therebetween;

p doping a central stripe with a defined longitudinal axis together with a first plurality of lateral protrusions and a second plurality of lateral protrusions, wherein the p doped central stripe and its longitudinal axis are aligned, wherein the lateral protrusions in the first plurality are distanced from each other and extend away from the p doped central stripe toward the first side, wherein each p doped lateral protrusion in the second plurality is axially positioned between a pair of p doped lateral protrusions in the first plurality and extends away from the p doped central stripe toward the second side;

$P^+$ doping a plurality of $P^+$ doped finger stripes into the workpiece from the first side toward the p doped central stripe with at least a portion of each $P^+$ doped finger stripe contacting a respective p doped lateral protrusion in the first plurality;

$N^+$ doping a plurality of $N^+$ doped finger stripes into the workpiece to individually extend inwardly from the second side into contact with at least a portion of each $N^+$ doped finger stripe contacting a respective p doped lateral protrusion in the second plurality, to counter-dope the p doped lateral protrusion and create a PN junction therewith; and etching into the upper layer of semiconductor material to create a waveguide core, wherein the waveguide core includes the p doped central stripe, has a width R and a height h, and wherein the etching step removes a portion of semiconductor material from the workpiece external to the waveguide core.

20. The method of claim 19 wherein the p doping step is accomplished using a first implant mask to perform fine lithography on the workpiece to create the p doped central stripe as a narrow continuous stripe along the length L with a width w1 less than R, and wherein the $P^+$ doping step is accomplished using a second implant mask to perform fine lithography on the workpiece, wherein the lateral P+ doped finger stripes have a width w2, and wherein the $N^+$ doping step is accomplished using a third implant mask to perform fine lithography on the workpiece to create the PN junctions and to provide the $N^+$ lateral finger stripes with a width w3; and wherein the etching step is accomplished using an etching mask.

* * * * *